US009774637B2

(12) United States Patent
Brandsma et al.

(10) Patent No.: US 9,774,637 B2
(45) Date of Patent: Sep. 26, 2017

(54) METHOD OF ESTABLISHING CONTROL RELATIONSHIPS, CONFIGURATION DEVICE, NETWORKED DEVICE AND COMPUTER PROGRAM PRODUCT

(71) Applicant: NXP B.V., Eindhoven (NL)

(72) Inventors: Ewout Brandsma, Eindhoven (NL); Maarten Christiaan Pennings, Waalre (NL); Aly Aamer Syed, Deurne (NL); Timo van Roermund, Eindhoven (NL)

(73) Assignee: NXP B.V., Eindhoven (NL)

( * ) Notice: Subject to any disclaimer, the term of this patent is extended or adjusted under 35 U.S.C. 154(b) by 642 days.

(21) Appl. No.: 14/015,132

(22) Filed: Aug. 30, 2013

(65) Prior Publication Data

US 2014/0068089 A1 Mar. 6, 2014

(30) Foreign Application Priority Data

Aug. 31, 2012 (EP) .................................... 12182670

(51) Int. Cl.

*G06F 15/16* (2006.01)
*H04L 29/06* (2006.01)
*H04L 12/28* (2006.01)
*H04L 12/24* (2006.01)
*G05B 15/02* (2006.01)

(52) U.S. Cl.

CPC .......... *H04L 65/1069* (2013.01); *G05B 15/02* (2013.01); *H04L 12/2809* (2013.01); *H04L 41/04* (2013.01); *G05B 2219/25295* (2013.01); *G05B 2219/2642* (2013.01); *G05B 2219/31197* (2013.01); *H04L 41/0893* (2013.01)

(58) Field of Classification Search

CPC . H04L 65/1069; H04L 12/2809; H04L 41/04; H04L 41/0893

See application file for complete search history.

(56) References Cited

U.S. PATENT DOCUMENTS 5,519,878 A 5/1996 Dolin, Jr.
5,565,855 A 10/1996 Knibbe
7,250,695 B2 * 7/2007 Connors ............ G06K 19/0705 307/117
7,391,297 B2 6/2008 Cash et al.
8,466,790 B2 6/2013 Palin et al.
8,598,978 B2 * 12/2013 Knode .................. H04L 12/282 340/12.23

(Continued)

FOREIGN PATENT DOCUMENTS

CN 101496006 A 7/2009
CN 102243488 A 11/2011

(Continued)

OTHER PUBLICATIONS

Elkhuizen, P. A. et al. "Kwaliteitsborging van installaties Evaluatie van bestaande instrumenten en een visie voor de toekomst", 74 pgs (Apr. 2005).

(Continued)

*Primary Examiner* — Moustafa M Meky
*Assistant Examiner* — Sm Z Islam

(57) ABSTRACT

A method for establishing control relationships between at least two networked devices is conceived. Further a corresponding configuration device, networked device and non-transitory computer program product are provided.

27 Claims, 2 Drawing Sheets

100

106

102

104

(56) References Cited

U.S. PATENT DOCUMENTS

2005/0280511 A1* 12/2005 Yokoyama ............ G06K 19/07 340/10.5
2006/0061482 A1* 3/2006 Monney .............. G06K 7/0008 340/9.1
2008/0004904 A1* 1/2008 Tran .................... A61B 5/0006 705/2
2010/0077254 A1 3/2010 Erdmann et al.
2010/0090619 A1* 4/2010 Adamson ............ H05B 37/029 315/312
2011/0025469 A1 2/2011 Erdmann et al.
2011/0199004 A1 8/2011 Henig et al.
2011/0266345 A1* 11/2011 Fowler .............. H05B 37/0272 235/439
2013/0076491 A1 3/2013 Brandsma et al.
2013/0141223 A1 6/2013 Brandsma et al.
2013/0198813 A1 8/2013 Van Roermund et al.
2013/0211761 A1 8/2013 Brandsma et al.
2013/0271268 A1 10/2013 Brandsma et al.
2013/0312072 A1 11/2013 Van Roermund et al.

FOREIGN PATENT DOCUMENTS

WO 2004/022873 A1 3/2004
WO 2004/027176 A2 4/2004
WO 2006/016845 A1 2/2006
WO 2006/026648 A2 3/2006
WO 2006/026711 A2 3/2006
WO 2009/128001 A2 10/2009
WO 2010/028135 A2 3/2010
WO 2010/028149 A2 3/2010
WO 2010/032227 A1 3/2010

OTHER PUBLICATIONS

Knauth, S. et al. "SARBAU Towards Highly Self-Configuring IP-Fieldbus Based Buidling Automation Networks", International Conference on Advanced Information Networking and Applications, 5 pgs (Mar. 2008).
Pister, K. S. J. et al. "TSMP: Time Synchronized Mesh Protocol", Proceedings of the LASTED International Symposium Distributed Sensor Networks, 8 pgs, (Nov. 2008).
"Wi-Fi Simple Configuration Technical Specification" Version 2.0. 0, Wi-Fi Alliance, 154 pgs (Dec. 2010).
"JenNet Protocol Stack", NXP, 1 pg, retrieved from the internet Aug. 28, 2013 at: http://www.jenic.com/products/protocol_stacks/jennet (2011).
Extended European Search Report for Patent Appln. No. 12182670.5 (Feb. 5, 2013).
Chinese Office Action for CN Application No. 201310344173.0 dated Aug. 17, 2015.

* cited by examiner

METHOD OF ESTABLISHING CONTROL RELATIONSHIPS, CONFIGURATION DEVICE, NETWORKED DEVICE AND COMPUTER PROGRAM PRODUCT

CROSS-REFERENCE TO RELATED APPLICATIONS

This application claims the priority under 35 U.S.C. §119 of European patent application no. 12182670.5, filed on Aug. 31, 2012, the contents of which are incorporated by reference herein.

FIELD OF THE INVENTION

The invention relates to a method for establishing control relationships between networked devices, to a configuration device, to a networked device and to a computer program product.

BACKGROUND OF THE INVENTION

A complete system comprising sensors, actuators, and controllers used to control HVAC, lighting, security, and safety in a building is called a Building Control System (BCS). Modern Building Control Systems comprise a large number of networked devices (e.g. sensors, lighting elements, light switches, valves, HVAC equipment, security equipment, etc). The most advanced buildings are approaching one networked device installed per square meter. Commissioning Building Control Systems is increasingly becoming labor-intensive and is prone to errors. For example, it has been shown that the technical installations in 70% of the utility buildings in the Netherlands do not function according to specification, causing an increase in energy consumption of 25%.

Commissioning involves joining devices into a network, localizing these devices and establishing control relationships between them. The latter is also called configuration. For example, a valve controlling the heating unit in a particular room must be controlled based on the temperature readings obtained from the temperature sensor in that very same room. Or, similarly, the light switch and the light sensor in a room must be used to control the lighting elements in that room.

A current practice in commissioning Building Control Systems is to separate the process of localization from the process of configuration (i.e. establishing control relationships). The existing approach towards localization is to manually identify a particular device, for example, by pulling a barcode sticker (i.e. unique ID) off that device and sticking it on the technical drawing of the building next to the symbol representing that very device. Subsequently, this association between sticker and symbol is input into the building commissioning system through further manual intervention (this is a time-consuming and error-prone task). Configuration is done afterwards by interacting with the building commissioning system (typically by means of a PC).

WO 2009/128001 A2 describes an improved method of localization. The location of a particular device is inferred from a specific sequence of reading electronic identification tags. However, also in this case, manual configuration is performed after this localization, for example, by using a PC. Performing localization for the entire building from behind a centralized (remote) PC is indirect, non-intuitive, and error-prone.

Some existing systems enable a more direct establishment of control relationships. For example, EnOcean switches can be configured to work with lamps through setting dip-switches. It is also known to establish a control relationship between two devices by pressing a button on each device within a limited time period from each other. However, such procedures are quite cumbersome.

In WO2010/032227A1 a method is described to establish a control relationship between, for example, a light switch and a lamp, simply by the bringing the lamp in close proximity of—i.e. "touching"—the light switch. In this case, an NFC-tag attached to the lamp is read by an NFC reader built into the light switch and the information read is used by the light switch to subsequently establish the control relationship. Furthermore, the concept of a tag echoing tool is described, covering the cases where bringing the lamp and the light switch in close proximity is impractical (for example when both are already mounted). This tag echoing tool first reads the NFC-tag attached to the lamp and then presents effectively a copy of that tag to the NFC reader in the light switch. Although this method of establishing control relationships by means of NFC-technology is direct, intuitive, and user-friendly (and therefore also less prone to errors), it requires a full-blown NFC reader in at least one of the devices for which a control relationship is to be established (in this example, in each light switch). This increases the cost of such a device and may furthermore negatively impact its power budget. The latter may particularly be an issue for energy-harvesting devices. Also, it is not possible to establish control relationships between a group of devices that all just have a mere NFC-tag (for example, it is not possible to easily group a set of lamps together enabling joint control). Furthermore, the lack of rich user interaction means during the procedure may make the establishment of more complex control relationships, for example involving multiple devices, or the performing of alternate operations, for example de-establishing a control relationship, less intuitive. Finally, although the lamp may be unpowered while being configured, the light switch always needs to be powered while being configured.

SUMMARY OF THE INVENTION

It is an object of the invention to provide a simplified method for establishing control relationships between networked devices of the kind set forth. This object is achieved by a method as claimed in claim 1, a configuration device as claimed in claim 24, a networked device as claimed in claim 26, and a computer program product as claimed in claim 27.

According to an aspect of the invention, a method for establishing control relationships between at least two networked devices is conceived, the method comprising the following steps: (a) a configuration device reads identification data of a first networked device from a first machine-readable tag, said first machine-readable tag being connected to said first networked device; (b) the configuration device writes the identification data of the first networked device to a second machine-readable tag, said second machine-readable tag being connected to a second networked device; (c) a controller unit of the second networked device reads the identification data of the first networked device from the second machine-readable tag; (d) the controller unit of the second networked device uses the identification data of the first networked device to establish a control relationship between the first networked device and the second networked device.

According to an exemplary embodiment of the invention, the second machine-readable tag comprises an RFID interface and the configuration device comprises an RFID interface, and in step (b), the configuration device writes the identification data of the first networked device to the second machine-readable tag via an RFID connection between the RFID interface of the second machine-readable tag and the RFID interface of the configuration device.

According to a further exemplary embodiment of the invention, the second machine-readable tag is connected to the controller unit via a wired connection, and in step (c), the controller unit reads the identification data of the first networked device from the second machine-readable tag via said wired connection.

According to a further exemplary embodiment of the invention, the first machine-readable tag comprises any one of an RFID transponder, a barcode element and a QR-code element.

According to a further exemplary embodiment of the invention, the identification data of the first networked device comprises any one of a unique identifier of the first machine-readable tag, a M[edia] A[ccess] C[ontrol] address of the first networked device, and a dynamic network address of the first networked device.

According to a further exemplary embodiment of the invention, the identification data of the first networked device include type data of the first networked device, and said type data determine the semantics of the control relationship.

According to a further exemplary embodiment of the invention, the first networked device is one of a plurality of first networked devices.

According to a further exemplary embodiment of the invention, the configuration device reads the identification data of all first networked devices prior to the establishment of the control relationship.

According to a further exemplary embodiment of the invention, the configuration device comprises a user interface which provides for selecting specific ones of the plurality of first networked devices, and selected specific ones of the plurality of first networked devices are included in the control relationship.

According to a further exemplary embodiment of the invention, the user interface further provides for deselecting specific ones of the plurality of first networked devices, and deselected specific ones of the plurality of first networked devices are excluded from the control relationship.

According to a further exemplary embodiment of the invention, the configuration device further provides for copying an existing control relationship between the first networked device and a third networked device from said first networked device to the second networked device.

According to a further exemplary embodiment of the invention, the control relationship comprises a membership of a group of networked devices.

According to a further exemplary embodiment of the invention, when the second networked device is in an off or low-power state, the second networked device is woken up as a result of an interaction between the configuration device and the second machine-readable tag, and/or when the first networked device is in an off or low-power state, the first networked device is woken up as a result of an interaction between the configuration device and the first machine-readable tag.

According to a further exemplary embodiment of the invention, when the second networked device is in an off or low-power state, the second networked device verifies, after or upon waking up, whether the identification data of the first networked device has been written to the second machine-readable tag, and if so, then the second networked device uses the identification data of the first networked device to establish a control relationship between the first networked device and the second networked device.

According to a further exemplary embodiment of the invention, the second networked device transmits a setup message to the first networked device in order to establish said control relationship, and the second networked device retransmits said setup message if it has not received a confirmation of receipt of said setup message from the first networked device after a predetermined amount of time.

According to a further exemplary embodiment of the invention, the second networked device transmits a setup message to the first networked device in order to establish said control relationship, and when the first networked device is in an off or low-power state, the first networked device transmits, after or upon waking up, a broadcast message into the network in order to retrieve said setup message.

According to a further exemplary embodiment of the invention, the second networked device transmits a setup message to a central registry in order to establish said control relationship, and when the first networked device is in an off or low-power state, the first networked device queries, after or upon waking up, the central registry for said setup message.

According to a further exemplary embodiment of the invention, the configuration device, upon reading the identification data of the first networked device from the first machine-readable tag, sets a flag in said first machine-readable tag, and when the first networked device is in an off or low-power state, the first networked device verifies, after or upon waking up, whether said flag is set, and if so, the first networked device checks for the presence of a setup message intended to establish said control relationship.

According to a further exemplary embodiment of the invention, the configuration device, upon reading the identification data of the first networked device from the first machine-readable tag, further writes contact data into the first machine-readable tag, and when the first networked device is in an off or low-power state, the first networked device uses, after or upon waking up, said contact data to query a device identified by said contact data for the presence of said setup message.

According to a further exemplary embodiment of the invention, the configuration device, upon reading the identification data of the first networked device from the first machine-readable tag, further writes a relationship identifier into the first machine-readable tag, said relationship identifier uniquely identifying a specific control relationship and a corresponding specific setup message, and the first networked device checks for the presence of said specific setup message after or upon waking up.

According to a further exemplary embodiment of the invention, a validation step is performed to determine whether the first networked device and the second networked device form part of the network.

According to a further exemplary embodiment of the invention, if the first networked device and/or the second networked device do not form part of the network, the first networked device and/or the second networked device are joined into the network prior to establishing the control relationship.

According to a further exemplary embodiment of the invention, the configuration device writes the identification data of the first networked device to the second machine-readable tag via a secure communication channel.

According to a further aspect of the invention, a configuration device is provided for use in a method of the kind set forth.

According to a further exemplary embodiment of the invention, the configuration device is an NFC-enabled smart phone or a web tablet.

According to a further aspect of the invention, a networked device is provided for use as a second networked device in a method of the kind set forth.

According to a further aspect of the invention, a computer program product comprising program elements executable by a configuration device or a second networked device is provided, wherein each program element comprises program instructions which, when being executed by the configuration device or the second networked device, cause said configuration device and second networked device to carry out or control respective steps of a method of the kind set forth.

BRIEF DESCRIPTION OF THE DRAWINGS

The invention will be described in more detail with reference to the appended drawings, in which.

DESCRIPTION OF EMBODIMENTS

Figure 1:
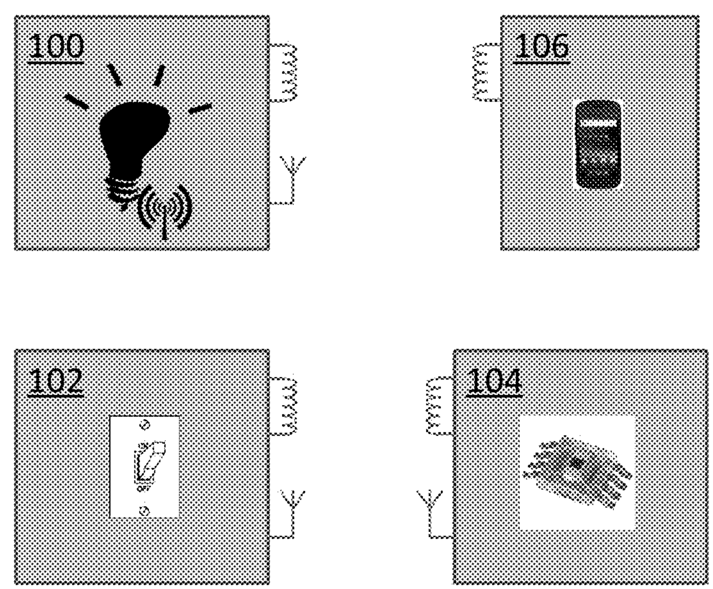
FIG. 1 illustrates a system according to an exemplary embodiment of the invention.

FIG. 1 illustrates a system according to an exemplary embodiment of the invention. The system comprises a plurality of networked devices 100, 102, 104 and a configuration device 106. According to an aspect of the invention, control relationships between the networked devices 100, 102, 104 are established by means of the configuration device 106, in that the configuration device 106 is used to identify the networked devices 100, 102, 104 by interacting with machine-readable tags, for example RFID tags, attached to them. In particular, at least one of the networked devices comprises a controller unit which is able to read identification data of other networked devices from its machine-readable tag. These identification data have been collected from the other networked devices by the configuration device 106, and subsequently written to the machine-readable tag by the same configuration device 106.

The system is, for example, a Building Control System and the networked devices 100, 102, 104 are, for example, building control devices such as lighting elements, light switches, and light sensors. The configuration device 106 is a device capable of interacting with the machine-readable tags, for example an NFC-enabled smart phone.

The method according to the invention establishes control relationships between two or more networked devices 100, 102, 104. For example, it makes a light switch and/or a light sensor control a lighting element. The networked devices 100, 102, 104 to be involved in the control relationship are identified by bringing the configuration device 106 in their close proximity in order to interact with their machine-readable tag. Further user interaction on the configuration device 106 may be required to establish control relationships between the thus identified networked devices 100, 102, 104. Thus, establishing control relationships is made intuitive by directly interacting with the networked devices 100, 102, 104, which reduces the installation effort and the probability of errors.

The machine-readable tags are relatively cheap and do not have a large impact on the power budget of the networked devices 100, 102, 104. The cost of the configuration device 106 is not really an issue—a single configuration device may be used to install an abundance of networked devices—and therefore it can comprise a full-blown RFID reader, for example, but also rich user interaction means (user interface) which further simplifies the process of establishing control relationships.

The networked devices 100, 102, 104 comprise a wireless network interface (e.g. Zigbee, Bluetooth, or Wi-Fi) to form a network together. However, alternatively, a wired network interface (e.g. Ethernet, DALI, or KNX) could be used. Advantageously, the configuration device 106 does not need to be equipped with such a network interface, because the above-mentioned networked device which comprises the controller unit capable of reading identification data of other networked devices from its machine-readable tag, may take control of the establishment of the control relationship, for example by transmitting messages to the other networked devices via its network interface.

The interaction between the configuration device 106 and the networked devices 100, 102, 104 takes place via short-range communication technology, for example RFID or NFC. Any communication link that is enabled by bringing the configuration device 106 in close proximity of the networked devices 100, 102, 104 aligning both devices in some other way or even making a galvanic contact by "touching" the devices may provide an alternative. Basically, the actions of "touching", "aligning" or "making contact" of the configuration device 106 device with the networked devices 100, 102, 104 signifies an explicit end-user intent to involve this particular networked device in establishing a control relationship. For example, infrared communication or USB are alternatives. For collecting the identification data from the networked devices 100, 102, 104, the configuration device 106 may also read a machine-readable optical tag, such as a barcode or QR-code sticker. In this case the configuration device 106 should comprise a compatible reader (e.g. a camera with barcode or QR-code recognition software).

Note, that the phase of establishing control relationships—or more general the phase of commissioning—is followed by a phase of normal operation during which these control relationships are used, for example, for enabling an end-user to operate the lights in a building.

Figure 2:
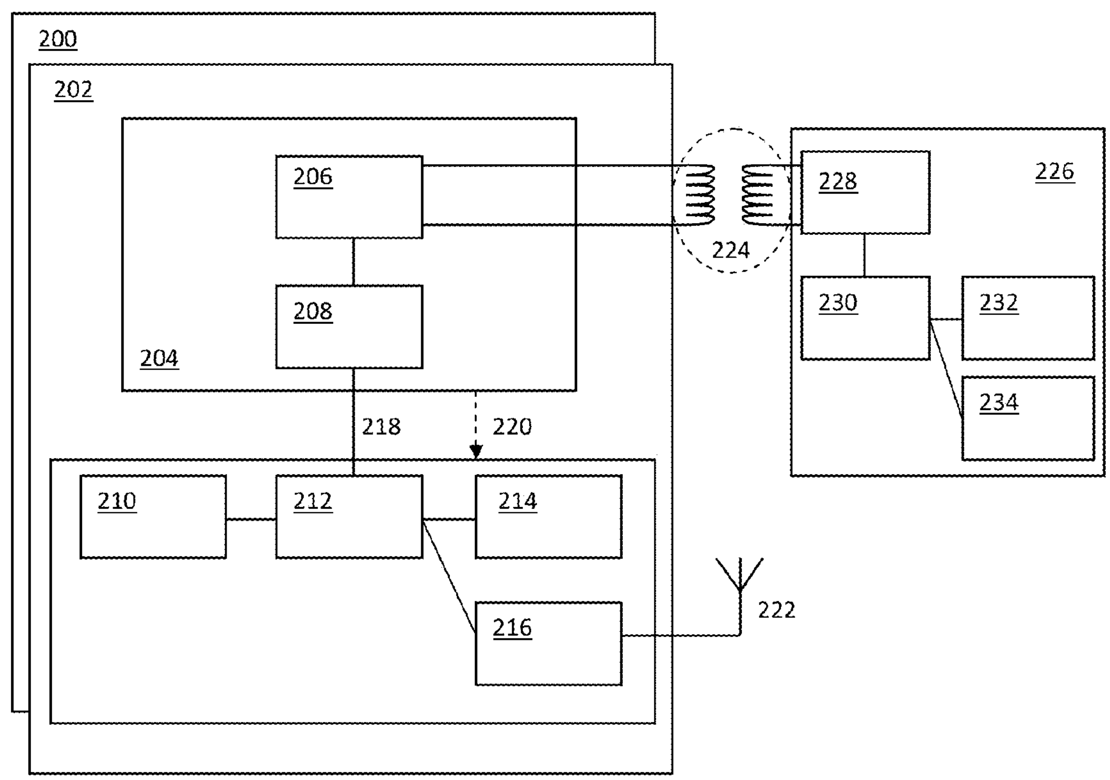
FIG. 2 illustrates a first networked device, a second networked device and a configuration device according an exemplary embodiment of the invention.

FIG. 2 illustrates a first networked device 200, a second networked device 202 and a configuration 226 device according an exemplary embodiment of the invention. In particular, the second networked device 202 comprises an RFID tag 204, a host controller 212, a host memory 210, a (wireless) network interface 216 and device functions 214. The RFID tag 204 comprises a non-volatile memory 208 and an RFID interface 206, the latter enabling the configuration device 226 to contactlessly read the contents of the non-volatile memory 208 while being in close proximity of the second networked device 202. The host controller 212 is arranged to read or write the non-volatile memory 208 through a host connection 218 (wired interface, for example an $I^2C$ interface). An RFID tag with a host connection is called a "Connected Tag". Optionally—see "Wake-up host controller upon touch" below—the RFID tag 204 is arranged to wake up the host controller 212 from an off- or very low-power state. The device functions 214 embody any of the primary functions provided by the components of the networked device, for example: sensing elements in a wireless sensor node, LEDs or fluorescent tubes and associated driver electronics in a lighting element or a breakable contact in a light switch.

The configuration device 226 comprises an RFID interface 228 (for example an NFC device), a controller 230, a memory 232, and a user interface 234. The RFID interface 228 is capable of reading or writing the non-volatile memory of an RFID tag when brought into close proximity. The RFID interface 228 also supplies the necessary power to the RFID tag to accomplish this operation through magnetic induction, so effectively, the RFID interface 228 is a so-called RFID reader as defined in the RFID Handbook by Klaus Finkenzeller, 3rd edition, 2010, or an NFC device with the same capabilities. The user interface 234 is used to further select networked devices for establishing a control relationship according to the method of the invention and/or to confirm the establishment of this control relationship. The specifics of the user interface 234 depend on the way the user interaction is done. See "User interaction" below for different options. The user interface 234 could, for example, be implemented as a touch screen or a combination of buttons and indicator LEDs.

According to this exemplary embodiment, all but one networked devices to be involved in the control relationship are first identified by the configuration device 226 reading identification data from each of their respective machine-readable tags. In this example, only a single one of these networked devices is shown, i.e. the first networked device 200. Optionally, some user interaction on the configuration device 226 is required to further select networked devices. Subsequently, the identification data of the thus far selected networked devices is written into the machine-readable tag of the last of the networked devices to be involved in the control relationship. This networked device is referred to as the second networked device 202. Finally, the host controller 212 of this second networked device 202 reads these identification data from its machine-readable tag 204 via a host connection 218 and uses them to establish the control relationship between the thus identified networked devices. The latter may involve transmitting messages into the network formed by the networked devices, which enables those devices to establish the control relationship.

It is noted that any particular networked device may act as a first networked device while establishing one control relationship and as a second networked device while establishing another control relationship, provided that the networked device has an RFID interface and a host connection. This increases the user-friendliness of the system, because the end-user may establish control relationships between a number of networked devices by performing an "NFC touch" on them in an arbitrary order.

The skilled person will appreciate that it is not necessary for the configuration device 226 to comprise a network interface. This is caused by the fact that the machine-readable tag 204 of the last touched networked device, i.e. the second networked device 202, is effectively used as a channel to transmit the desired control relationship into the network formed by the networked devices.

The steps of the method according to the invention may be implemented, for example, as follows:

1. An end-user consecutively (and/or simultaneously) touches each of the networked devices for which the control relationship is to be established with the configuration device 226, with exception of the last one. These networked devices are represented by a single networked device in FIG. 2, i.e. the first networked device 200. In each case this causes the configuration device 226 to read a unique identifier from the non-volatile memory of an RFID tag connected to the particular first networked device 200 being touched. Each time a controller 230 of the configuration device 226 will store this unique identifier, as read by its RFID interface 228, into its memory 232.

2. The end-user optionally interacts with the configuration device 226 via a user interface 234 to further select and/or deselect networked devices for inclusion in the establishment of the control relationship.

3. Subsequently, the end-user touches the last one of the networked devices for which the control relationship is to be established with the configuration device 226. This networked device is represented by the second networked device 202 in FIG. 2. This action causes the configuration device 226 to write a message containing the unique identifiers of the networked devices touched in step (1) and/or further (de)selected in step (2) into the RFID tag 204 of the second networked device 202, which also implicitly confirms that a control relationship must be established. The skilled person will appreciate that the unique identifier of the second networked device 202 does not have to be part of the message, or, in other words, that the inclusion of the second networked device 202 in the control relationship is implied by the mere writing of the message. However, when this message is forwarded by the second networked device in the network the information that the second networked device 202 should be included in the control relationship may have to be added explicitly to said message by the second networked device 202.

4. Upon detecting the message written into the non-volatile memory 208 of its RFID tag 204, the host controller 212 of the second networked device 202 reads this message from the non-volatile memory 208 via the host connection 218. The second networked device 202 may administer the control relationship in its own memory 210 and/or transmit message(s) to one or more other networked devices using its (wireless) network interface, which causes those devices to administer the control relationships in their memories for further usage during normal operation.

Whether the second networked device 202 administers the control relationship itself and/or transmits message(s) to have one or more other networked devices do this, depends again on the architecture of the Building Control System and the type of devices involved in the control relationship (including the type of the second networked device).

Using a Unique Identifier to Address Networked Devices

Each networked device has a unique identifier which is stored in the RFID tag. The unique identifier of a particular networked device is typically used to address messages to that networked device either sooner or later. It is used sooner if the particular networked device administers a control relationship and a message has to be sent to it as part of step (4) of the above-described implemented method. It is used later if one or more other networked devices administer a control relationship and as part of that have stored the unique identifier of this particular networked device in their (non-volatile) memories. In this case, the unique identifier may be used during normal operation of the Building Control System to send control messages to the particular networked device (for example, a light switch, when actuated, sending an on/off/dim message to a lighting element that it has a control relationship with). This means that it may be advantageous if those unique identifiers are effectively network addresses as used in the network formed by the networked devices. However, this is not absolutely necessary. For example, if the network supports broadcast, a message could be broadcast including the unique identifier of the intended recipients in its payload. Clearly, networked devices receiving such a broadcast message must first inspect the payload to verify whether they are indeed an intended recipient.

Considering the above, the unique identifier could, for example, be:

a) The UID of the RFID tag (each RFID tag gets a unique identifier upon manufacture).

b) The MAC-address of the networked device (each network interface gets a unique MAC-address, i.e. a Media Access Control address, upon manufacture).

c) The dynamic network address of the networked device. One important note should be made: a dynamic network address can only be "dynamic" to the extent that it is determined latest upon network joining (rather than upon device manufacture). After network joining, or specifically after one begins to establish control relationships, the dynamic network address may not change anymore. Otherwise, already administered control relationships in terms of those dynamic network addresses make no sense anymore.

As mentioned above, the use of a unique identifier that is not a network address—example (a) above—requires broadcast messages with the unique identifier in their payload. In many networking standards, a networked device has a globally unique MAC-address—example (b)—which typically is not directly used for routing in the network. Instead—example (c)—a dynamic network address, for example a dynamic IP-address as assigned by a DHCP-server, is used for actual routing in the network. Dynamic addresses have an advantage when routing in large, multi-hop, heterogeneous networks such as the Internet. This implies that it may be advantageous if the unique identifier is a network address and in particular if it is a dynamic network address. Furthermore, it should be noted that the host controller—and/or the networked device's (wireless) network interface—and the RFID tag must know the unique identifier.

If the RFID tags of the networked devices are so-called "Connected Tag", i.e. if they have a (wired) connection with the controller units of the respective networked devices, this is relatively straightforward. It is noted that the second networked device 202 has such a host connection 218, whereas the other networked devices (the plurality of first networked devices 200 may or may not have such a host connection 218. In fact, the first networked device 200 may also have a machine-readable tag which is not based on RFID technology, such as a barcode element or QR-code element, provided that the configuration device 226 is capable of reading such a tag.

In case of a Connected Tag, for each of the above examples, the following measures need to be taken for the host controller/(wireless) network interface and the RFID tag to get to know the unique identifier:

a) UID: the host controller reads the UID from the RFID tag each time it needs it. Alternatively, it reads it once upon initialization and caches it in the host memory.

b) MAC-address: the host controller obtains the MAC-address from the (wireless) network interface and writes it into the RFID tag upon first initialization.

c) Dynamic network address: when the host controller has obtained a dynamic network address as part of the process of network joining, it writes it into the RFID tag.

In case of a plain RFID tag, i.e. without a host connection, the following measures need to be taken:

a) UID: upon manufacture of the networked device, the UID from the attached RFID tag must be read out and programmed into the (non-volatile part of the) host memory.

b) MAC-address: upon manufacture of the networked device, the MAC-address of the (wireless) network interface must be written into the RFID tag.

c) Dynamic network address: as part of a prior art network joining procedure—for example, "Password Token" as described in "Wi-Fi Simple Configuration, Technical Specification", Wi-Fi Alliance, Version 2.0.0, December 2010—first some networking credentials are read by the configuration device from the RFID tag of the particular networked device, followed by (in-band) communications over the network formed by the networked devices, eventually leading to the particular networked device becoming a member of the network and obtaining a dynamic network address. If, additionally, the particular networked device transmits a message containing this newly obtained dynamic network address to the configuration device, the configuration device can subsequently write it into the RFID tag of the particular networked device. Note, however, that this network joining procedure may take some time to complete, during which period the end-user should preferably keep the configuration device in close proximity of the particular networked device. In this case, audio-visual feedback (e.g. a beep sounding, a LED blinking or a message on a display) may be helpful to notify the end-user of successful completion of the combined operation.

Storing Further Device Information in the RFID Tag

Different types of networked devices will be present in the Building Control System, for example light switches, light sensors, and lighting elements. The types of the networked devices involved in a control relationship determine the semantics of that control relationship. For example, establishing a control relationship between a light switch and a lighting element means that the actuation of the light switch will control the lighting element. The knowledge of these semantics (i.e. the so-called "domain model") is somehow embedded in the system. For example, the program code stored in the host memory of a light switch—and executed by its host controller—contains instructions pertaining to its role in the control relationship, whereas the program code stored in the host memory of a lighting element—and executed by its host controller—contains instructions pertaining to its role in the control relationship, which is a different role. Furthermore, these semantics may determine which networked device(s) will administer the established control relationship (see "Administering the established control relationship" below) and therefore which networked devices need to receive a message in step (4) of the above-described implemented method.

Although it is possible to interrogate the networked devices involved in the control relationship (e.g. about their respective types) utilizing the network, it may be advantageous to know such information beforehand, for example because fewer message exchanges will be required in that case. Therefore, optionally, additional information about the networked device may be stored in its RFID tag in addition to its unique identifier. This type is then also read in step (1) of the above-described implemented method and stored in the memory of the configuration device. In step (4) of the above-described implemented method this information may play a role in determining which networked devices to transmit a message to.

Administering the Established Control Relationship

Depending on the system architecture of the Building Control System, different classes of devices may be responsible for administering control relationships. For example, one could distinguish between the following classes of devices in a Building Control System: sensors (e.g. light switches, light sensors, temperature sensors), actuators (e.g. lighting elements, ventilators, heaters), and controller devices (i.e. centralized or decentralized devices whose main purpose is to serve as a kind of intermediate between sensors and actuators).

By means of example, the following alternative approaches can be conceived:

a) Sensors administer control relationships. This enables sensors to send direct messages (i.e. no broadcast) to actuators, at least when the unique identifiers are routable network addresses. When only one or very few actuators are controlled by a single sensor in deep multi-hop networks this may lead to efficient use of network bandwidth and it avoids activity of actuators that are not involved in the control relationship.

b) Actuators administer control relationships. In this case sensor messages are broadcast and must contain the sensor's unique identifier. Actuators listen to all sensor broadcasts and determine whether or not they have to act on a particular message, based on whether the unique identifier of the transmitting sensor appears in their administration. When a single sensor is used by many actuators, this reduces the number of messages sent by the sensor for a single event or measurement to only one, saving network bandwidth, as well as energy. The latter is a clear benefit for energy-constrained sensors.

c) Controller devices administer control relationships. In such architecture, sensors send a single message (for a single event or measurement) to a controller device and the controller device may transmit messages to the actuators that depend on this sensor. Note that the control of an actuator by the controller device may be the result of an algorithm running on the controller taking a variety of sensors (i.e. sensor fusion) and other context parameters into account.

It is noted that administering control relationships may be done by different classes of devices and therefore that the above-described implemented method may have to consider carefully, in step (4), which networked devices to transmit a message to. As discussed in the section "Storing further device information in the RFID", the device class may be derived from the device type as stored in the RFID tag. Note that, in the present context, a "class" (e.g. sensor) is a more generic notion than a "type" (e.g. light sensor).

User Interaction

In step (2) of the above-described implemented method it is mentioned that the end-user optionally interacts with the configuration device to further select and/or deselect networked devices. Many alternative ways can be imagined for this user interaction to take place. By means of example, a number of these ways (cases) is described in more detail below, but the scope of the invention is not to be limited to just these examples. Furthermore, a configuration device may support a combination of different ways of user interaction.

Touch Screen for Further Selection and De-Selection of First Networked Devices

In this case the configuration device comprises a touch screen (or another combination of a graphical display and a pointing device). The configuration device could, for example, be an NFC-enabled smart phone or a web tablet. The screen will display a plurality of graphical representations—icons—of networked devices. Touching a particular first networked device with the configuration device, in accordance with step (1) of the above-described implemented method, will cause an icon representing that particular network device to (re)appear on the screen. Also it may be selected by default for subsequent inclusion in the control relationship.

Additionally, the user interface may provide for means to search for networked devices present in the Building Control System that may—or may not—have been previously touched by this particular configuration device. Search parameters may include the type or class of the networked device, the location (e.g. room) of the networked device or networked devices that do not participate in a control relationship yet. The result of a search action will again comprise icons representing networked devices that can be used to establish control relationships by first selecting them.

Thus, the first networked devices to be included or excluded in the control relationship are selected or deselected via a graphical user interface.

It is noted that the second network device is, by definition, always included in the control relationship, and therefore it does not need to be selected explicitly via the user interface. In other words, only the icons corresponding to the plurality of first networked devices to be involved in the control relationship need to be selected. Subsequently, the second networked device is selected by "NFC touch" of the physical device itself. This action also doubles as confirmation. A simple case is establishing a control relationship between only two networked devices. In this case, the icon corresponding to the first networked device is selected on the touch screen and the second networked device is touched physically by means of NFC.

In some cases it may be necessary to confirm that the last touched networked device is in fact the second networked device. For example, this is necessary when all devices in the network can act as a first networked device or a second networked device, i.e. when they comprise a Connected Tag and when it should be possible to configure them in an arbitrary order. In this case, it is sufficient to press a confirmation button (graphical or physical) before performing the last touch.

Touch Twice

A special case of what is described above under "Touch screen for further selection and de-selection of first networked devices" is to automatically select the previously touched networked device. In other words, simply establish a control relationship between the two most recently touched networked devices. The benefit of this embodiment is that it can be realized by means of a configuration device comprising no or very limited user interaction means: no touch screen, but a confirmation button or, alternatively, a reset button to correct for mistakes may come in handy. This configuration device may be very cost effective and, for example, have the form-factor of a pen (installation pen). As such it may be supplied together with a networked device for building automation, such as for example a home gateway. In a very specific embodiment, the home gateway may comprise a cavity to store the installation pen. Optionally, the home gateway may provide means to charge the battery of the installation pen while it is stored in the cavity.

De-Establishing a Control Relationship, Grouping and Copying Control Relationships A number of commissioning operations related to establishing a control relationship are: de-establishing a control relationship, grouping and copying control relationships. Optionally, such commissioning operations may be supported by the system and method according to the invention, for example, as described below.

De-Establishing a Control Relationship

When re-commissioning a building—for example when changes are made to the floor plan—or simply to correct mistakes, it may be necessary to dissolve a control relationship or to remove one or more devices from that control relationship. In case a simple installation pen is used for establishing a control relationship, it may have a special mode switch to be in "de-establishing" mode instead of in "establishing" mode. In one variant, touching a single networked device while in "de-establishing" mode may remove all control relationships relating to that networked device. In another variant, subsequently touching two networked devices will remove the control relationship between them.

Clearly, in step (4) of the above-described implemented method the messages sent must now cause their recipients to de-administer, rather than administer control relationships. This can be accomplished by distinguishing different types of messages (e.g. "administer" vs. "de-administer" messages).

Grouping

Grouping is a notion applied to networked devices of a similar type. For example, a group comprising lighting elements could be created. Subsequently, this group could be used as a single entity in establishing control relationships. For example, a lighting switch can be made to control a group of lighting elements; actuating the light switch causes all the lighting elements to switch on or switch off simultaneously.

Establishing groups can be very similar to establishing control relationships, but clearly the semantics are different. As a matter of fact, the types or classes of the respective networked devices involved may determine whether a grouping or a control relationship is being established.

A grouping could be administered by all of the networked devices comprised in the group. Assume furthermore that also a control relationship has been accomplished between a member of that group (e.g. lighting element) and another networked device (e.g. lighting switch). When, for example, the lighting switch sends an on/off/dim message to the member of the group (i.e. lighting element) that it has a control relationship with, that group member will forward this message to the other lighting elements comprised in the group.

Alternatively, a grouping could be administered by a controller device, the controller device functioning as a proxy. For example, during normal operation, a lighting switch having a control relationship established with a group of lighting elements will send an on/off/dim message to the controller device and the controller device will forward this message to each of the lighting elements comprised in the group. In this case the group is essentially a virtual device and the proxy will typically support a plurality of such groups or virtual devices. For that reason, the RFID tag of the proxy cannot be used to unambiguously establish control relationships with the group. Alternatively, a dedicated RFID tag (e.g. a so-called NFC-sticker) can be written to as part of the grouping procedure. For example, all lighting elements in a room can be "represented" by an NFC-sticker located next to the door.

Copying Control Relationships

In some cases, it may be useful for a networked device to have the same control relationships as another networked device. For example, a first lighting switch controlling all lighting elements in a room is located near a first door of that room. Now a second lighting switch is installed near a second door of the same room and also needs to control all lighting elements. Rather than establishing these control relationships one-by-one again, the end-user would simply like to "clone" the control relationships from the first lighting switch into the second lighting switch. This can also be accomplished with an NFC touch. For example, when the configuration device is an installation pen, it can be accomplished by setting the installation pen in a dedicated "clone" mode by means of a special mode switch. While set to this "clone" mode the end-user first touches the first lighting switch with the installation pen and subsequently touches the second lighting switch with the installation pen.

Copying control relationships may be realized in different ways depending on, amongst others, where the control relationships are administered in the system (see "Administering the established control relationship"). As an example, it is assumed that the networked devices involved in the copying administer all the control relationships they are involved in (or at least the subset thereof that needs to be copied). In this case, the control relationships of the first networked device—i.e. the set of networked devices that the first networked device has a control relationship with—should be retrieved from the first networked device and provided to the second networked device through intervention of the configuration device. For example, the configuration device reads the control relationships from the RFID tag of the first networked device upon "touch" and writes them into the RFID tag of the second networked device upon subsequent "touch". Subsequently, the host controller of the second networked device reads those control relationships from the RFID tag through the host connection and administers them (or simply leaves them in the RFID tag, in case networked devices maintain their administration of control relationships in their respective RFID tags). In case the first networked device does not administer all its control relationships, it may query the network or a central server/registry for data relating to these control relationships, and subsequently provide those data to the configuration device.

Wake-Up Host Controller Upon Touch

Networked Devices that Sleep Most of the Time

Some networked devices may be in an off—or very low-power—state for most of the time. For example, a wireless sensor node has very little energy at its disposal. It is powered by an energy harvester or a small primary battery and has to provide for years or even decades of unattended operation. As its only duty is to measure certain physical parameters (e.g. temperature, ambient light and/or specific gas concentrations) periodically (e.g. once every 1-15 minutes), it wakes up every period for a brief amount of time (e.g. 10 milliseconds), just long enough to do its measurements and transmit a message into the network. For the rest of the period it is fast asleep and not able to receive any messages. Note that, as part of its normal operation, it does not have to receive messages with the possible exception of acknowledgements. A similar example is a light switch, powered by a small battery or a mechanical harvester, that only wakes up and transmits a short message when pressed. For the rest of the time it also is fast asleep and unable to receive messages.

It may be the case that these types of devices, that are asleep most of the time, also need to be woken up when they are involved in the establishment of a control relationship. To avoid an end-user having to wake them up manually—for example by pressing a button, that actually may have been provided exclusively for such purpose—the interaction of the configuration device with its RFID tag may be used as a wake-up trigger instead. This simplifies the commissioning process and avoids the cost of an extra button. The length of the period to be awake is discussed in more detail in "Waking up a networked device when reading its RFID tag" below.

Wake-Up Signal

The wake-up signal 220 is provided from the RFID tag 204 to the host controller 212 of the second networked device 202. When an RFID device 228 (for example an NFC device) interacts with the RFID tag 204, the wake-up signal 220 is raised and the second networked device 202 is woken up from its off—or very low power—state (i.e. it is switched on).

Different conditions may be used to raise the wake-up signal 220. In one variant the wake-up signal 220 is raised when the appearance—or the subsequent disappearance—of a field generated by an RFID device 228, is detected. In another variant the wake-up signal 220 is raised only when that RFID device 228 addresses this particular RFID tag 204. In yet another variant the wake-up signal 220 is only raised when the memory 208—or predetermined memory cells thereof—have been written to or read from (or both) during the interaction. In other words, the raising of the wake-up signal 220 may be a more or less specific indication of an event on the RFID connection 224 (e.g. merely an RFID field applied/removed vs. a specific memory cell read/written).

FIG. 2 suggests that the wake-up signal 220 is fed to a pin of the host controller 212 causing it to wake up from an off—or actually very low-power—state. Alternatively, the power supply of the second networked device 202 is disabled or disconnected in the inactive state and the wake-up signal 220 pulls a switch, e.g. galvanic or MOSFET, to power the second networked device 202 to cause it to move to the active state. In this way, power consumption in the inactive state is zero, but no state can be retained in the second networked device 202 (other than the contents of the non-volatile memory 208 or another non-volatile memory in the second networked device 202. This implies that some startup time (i.e. boot time) is required before the second networked device 202 is fully functional. It is noted that the use of a wake-up signal 220 from the RFID tag may also be beneficial if the second networked device 202 is not switched off (or in a very low-power state). In this case, the wake-up signal 220 simply serves as an interrupt signal to the host controller 212, triggering it to start executing the next step of the method according to the invention.

Waking Up a Networked Device when Writing the RFID Tag

According to an aspect of the invention, the last one of the networked devices (i.e. the second networked device 202) for which the control relationship is to be established gets a message written into its RFID tag 204. In response to this message being written, the host controller 212 may be woken up by means of the wake-up signal 220 and take action, specifically, administer the control relationship and/or transmit one or more messages (see step (4) of the above-described implemented method). Especially, if the second networked device 202 has to transmit messages to other networked devices in order for them to administer the control relationship there may be a desire for this action to take place substantially instantaneously. Only when the action takes place substantially instantaneously, these other networked devices will be functional in accordance with the new control relationship substantially instantaneously. Furthermore, when one or more of these other networked devices themselves are woken up specifically for the duration of the establishment of the control relationship, substantially instantaneous completion helps save them power.

Waking Up a Networked Device when Reading its RFID Tag

In one example of a Building Control System, the control relationship is administered by the sensors (including switches) in the network. See the section "Administering the established control relationship" above. They should remember the unique identifiers (e.g. addresses) of other networked devices, specifically actuators such as lighting elements or HVAC equipment. During normal operation they will use these unique identifiers/addresses to transmit messages specifically to those other networked devices.

In order to obtain the necessary information—i.e. unique identifiers—to administer the control relationship they should be prepared to receive messages using their (wireless) network interface as part of step (4) of the above-described implemented method. These messages are transmitted by the last one of the networked devices (i.e. the second networked device 202).

In order to receive messages these networked devices first need to be woken up. As an optional feature of the invention, it is proposed to wake up these networked devices (i.e. the plurality of first networked devices 200) by means of a wake-up signal, as soon as (the unique identifier stored in) their RFID tags are read by the configuration device 226. After receipt of the message, it administers the control relationship and goes back to sleep.

It should be observed however that, according to this optional feature, the first networked device 200 still may be awake for an extended period of time. There may be a considerable amount of time in between the moment that the RFID tag of the first networked device 200 is read in step (1) and the moment that the end-user confirms the establishment of the control relationship in step (3) of the above-described implemented method, which triggers the transmission of the message that the first networked device 200 is waiting for.

As a matter of fact, this amount of time may be unbounded as the end-user may break off the procedure of establishing the control relationship halfway through. To prevent that the first networked device 200 waits indefinitely and depletes its energy reserves as a result, a time-out may be used (e.g. five minutes). If a message is not received within this time-out period, counting from the moment of reading the RFID tag of the first networked device 200 by the configuration device 226, the first networked device 200 goes back to sleep.

However, being awake for five minutes may even be too much for many energy-constrained networked devices. Therefore, an alternative is for these devices to wake up at predetermined moments, for a short interval of time, and either actively checking for messages destined from them at some proxy device or for the network protocol be designed such that energy-constrained nodes will only be sent messages at those predetermined moments. Examples of such protocols are described below under "Powerless commissioning of networked devices". In this case the wake-up signal may still be used to bring the networked device from a state where it is not able to receive any messages to a state where it wakes up at predetermined moments to check/wait for a message.

Powerless Commissioning of Networked Devices

Optionally, both the first and the second networked device are commissionable while they are not powered (or otherwise not yet reachable over the network). In other words, the end-user is able to touch them with an NFC-enabled phone, for example, while they are not powered, and still the intended control relationship is established.

For example, a retrofit light bulb with a wireless network interface embedded in its base can be made part of a control relationship before it is screwed in the socket. Once in the socket it may be too impractical to access with the configuration device.

Furthermore, control relationships can also be established before the network connecting the devices is operational. See also the section "First touch: combination with network joining and/or localization" below. Networked devices can be commissioned randomly and only somewhere along the way the network gradually becomes operational. It is not necessary to first build up a functional network, before being able to establish control relationships.

Powerless commissioning can be achieved in various ways, as explained below.

Second Networked Device

The second networked device may be arranged to check whether the identification data has been written into its corresponding tag after it powers up, and if so, to send messages to all concerned (for example a broadcast message to all first networked devices to be included in the control relationship, a specific message to first networked devices with certain types or a message to a central registry). In other words, after power up the second networked device checks whether the identification data has been written into its corresponding tag and, if so, it uses the identification data to establish the control relationship.

First Networked Device

For the first networked device powerless commissioning can be achieved in various ways, for example:

- The second networked device always expects an acknowledgement message from each intended recipient to get confirmation of proper reception of all the messages it sends as part of step (4) of the exemplary method, i.e. the step in which the identification data is used to establish the control relationship. If such an acknowledgement is not received, it will retransmit the message(s) after a predetermined amount of time.
- The first networked device will send a broadcast message into the network if it powers up. With this broadcast message it will query the network for any second networked devices administrating a control relationship that it is part of. Upon receiving such a broadcast message a second networked device will reply with a message if a setup message was written into its RFID tag that requires the first networked device to administrate a control relationship. It is noted that in this particular embodiment there are two ways in which a first networked device can get hold of a message: (1) if the first networked device powers up before the second networked device, the second networked device will send the message when it powers up and (2) if the second networked device powers up before the first networked device, the first networked device will obtain the message in reply to its broadcast message as sketched above. Furthermore, it is noted that this method does not work if the second networked device is offline again, so the underlying assumption is that after a networked device is part of a network it remains part of the network.
- The second networked device registers its messages (for establishing control relationships obtained through its RFID tag) with a central registry. It is noted that there may be more than one registry in the system and that the registry function may be combined with other functions in a single device. Upon power-up, the first networked device queries the registry for any messages (i.e. "setup messages" intended for establishing control relationships) that it should administer itself. If the registry is aware of such messages it will send them to the first networked device in a reply to its query. Additionally, the central registry may instantly forward newly registered setup messages to first networked devices that are powered already (and have a need to administer the control relationship). Alternatively, the second networked device may transmit its messages to both the registry and those already powered first networked devices. In any case, the basic idea behind this embodiment is that a central registry (which is always powered) acts as a proxy for the (not yet powered) first networked devices.

Optional Flag, Contact Address and/or Control Relationship Identifier

Optionally, the configuration device may set a flag (i.e. write a predetermined value, e.g. "1", into a predetermined memory location) in the RFID tag of the first networked device during the same end-user "touch" operation when it reads the unique identifier from that RFID tag. This flag can subsequently be used by the first networked device upon power-up to determine whether it needs to check for new setup messages (i.e. messages intended for establishing control relationships). After acting upon the set flag, the first networked device should also clear the flag. Optionally, this may only be done if the optional type information in the RFID tag of the first networked device indicates that this first networked device is indeed to be involved in administering the control relationship.

Additionally, next to the flag (or effectively also acting as the flag) a contact address may be written into the RFID tag of the first networked device. Upon power up, the first networked device may use this contact address to obtain further information about the to be established control relationships, in particular, to query a device identified by said contact data for the presence of a setup message. For example, the contact address may be the address of the registry mentioned above. Notice, that upon the first device contacting the registry, that registry may not yet be aware of the control relationship (either because the second networked device hasn't been "touched" yet, or because the second device hasn't powered up yet). In this case, the registry may remember the request of the first networked device for further information and reply as soon as it becomes aware of the control relationship.

Additionally, the flag and/or the contact address may be accompanied by a (unique) identifier identifying the (to be established) control relationship itself (this unique identifier may be generated by the configuration device). This control relationship identifier may help the registry in identifying the specific control relationship that first and/or second networked device are communicating about. This may be relevant when multiple control relationships involving a particular first and/or second networked device are established when the respective device is not powered. It is noted that in that case also multiple messages, flags and/or contact addresses must be stored in the respective RFID tags. In other words, data for a control relationship which is still being established should not be overwritten. It is noted that for these optional embodiments it is necessary that also the first networked device comprises a Connected Tag (i.e. the first machine readable tag must be an RFID tag with a wired host connection).

First Touch: Combination with Network Joining and/or Localization

In some cases, network joining needs to be performed before control relationships can be established. This is obvious from the fact that messages need to be sent through the network to administer control relationships and also that, in some embodiments, a dynamic network address—being an end-result of network joining—is used as the unique identifier. Like establishing control relationships, network joining is also an operation that can advantageously be performed by NFC-based "touching" with a portable configuration device.

A further advantage (i.e. more Ease-of-Install) can be obtained when a single NFC "touch" is used to both join a device into a network and identify it for establishing a control relationship. In some embodiments—e.g. when using dynamic network addresses as unique identifiers—some latency may be involved, i.e. the end-user may have to keep the portable configuration device in close proximity of the networked device (that is to be joined and identified) for a longer period of time. Audio-visual feedback (e.g. a beep sounding, a LED blinking or a message on a display) may be helpful to notify the end-user of successful completion of the combined operation.

If this is to be accomplished, then step (1) of the above-described implemented method has to be adapted. For each networked device to be identified, first a validation step is performed to determine whether it is already part of the network. If a device it not part of the network, network joining is performed in addition to identification. When the RFID tag is a Connected Tag, the host controller could set a flag in the non-volatile memory indicating that the networked device is indeed part of the network. In case the unique identifier is a dynamic network address, the presence of a valid dynamic network address could be interpreted as such a flag.

When the RFID tag is not a Connected Tag (i.e. a host connection is not provided) some message exchange is required to perform the validation. This message exchange may be the same message exchange that is used to accomplish network joining. If the networked device receiving a network joining request is already part of the network it will simply reply this fact (or just "successfully joined") to the portable configuration device. Again some latency may be involved, necessitating proper audio-visual feedback to the end-user.

Similarly, the operation of localizing a networked device may be combined in a single "touch" with identifying the networked device for establishing a control relationship according to the present invention. Or even, the three actions of network joining, localization, and identification for establishing a control relationship may be combined in a single "touch".

Securely Establishing Control Relationships

The procedure of establishing control relationships should be secure, meaning that unauthorized people should not be able to perform this procedure with just an arbitrary NFC-enabled mobile phone, for example. Otherwise unauthorized people might gain control over, for example, lighting, HVAC or even security or safety related functions in a building, which is not desirable.

Generally speaking, the networked devices—and hence the RFID tags attached to them—are accessible to whoever has access to the building. Therefore, if a building is accessible to the general public, the general public is also able to read or write these RFID tags.

According to an aspect of the invention, the RFID tag (i.e. Connected Tag) of the second networked device is effectively used as a communication gateway for transmitting messages into the network formed by the networked devices. The communication link between the RFID interface/device of the (authorized) portable configuration device and the RFID tag of the second networked device must be secured as well. This can, for example, be easily accomplished by regarding this communication link as an extension of the network formed by the networked devices. This means that the (authorized) portable configuration device should obtain the credentials of that network as part of becoming an authorized portable configuration device.

It is noted that if the portable configuration device is also used for network joining as proposed in the section "First touch: combination with network joining and/or localization" above, it already has knowledge of those credentials because it is used to pass them on to other networked devices. Alternatively, the RFID tags of the already commissioned devices could be locked.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 networked device
102 networked device
104 networked device
106 configuration device
200 first networked device
202 second networked device
204 RFID tag
206 RFID interface
208 non-volatile memory
210 host memory
212 host controller
214 device functions
216 wireless network interface
218 host connection
220 wake-up signal
222 wireless network connection
224 RFID connection
226 configuration device
228 RFID interface
230 controller
232 memory
234 user interface

The invention claimed is:

1. A method for establishing control relationships between at least two networked devices, the method comprising the following steps:

(a) a configuration device reads identification data of a first networked device from a first machine-readable tag, said first machine-readable tag being connected to said first networked device;

(b) the configuration device writes the identification data of the first networked device to a second machine-readable tag, while supplying a power necessary to accomplish said writing to the second machine-readable tag, said second machine-readable tag being connected to a second networked device;

(c) a controller unit of the second networked device reads the identification data of the first networked device from the second machine-readable tag;

(d) the controller unit of the second networked device uses the identification data of the first networked device to establish a control relationship between the first networked device and the second networked device.

2. A method as claimed in claim 1, wherein the second machine-readable tag comprises an RFID interface and the configuration device comprises an RFID interface, and wherein, in step (b), the configuration device writes the identification data of the first networked device to the second machine-readable tag via an RFID connection between the RFID interface of the second machine-readable tag and the RFID interface of the configuration device.

3. A method as claimed in claim 2, wherein the second machine-readable tag is connected to the controller unit via a wired connection, and wherein, in step (c), the controller unit reads the identification data of the first networked device from the second machine-readable tag via said wired connection.

4. A method as claimed in claim 1, wherein the first machine-readable tag comprises any one of an RFID transponder, a barcode element and a QR-code element.

5. A method as claimed in claim 1, wherein the identification data of the first networked device comprises any one of a unique identifier of the first machine-readable tag, a M[edia] A[ccess] C[ontrol] address of the first networked device, and a dynamic network address of the first networked device.

6. A method as claimed in claim 1, wherein the identification data of the first networked device include type data of the first networked device, and wherein said type data determine the semantics of the control relationship.

7. A method as claimed in claim 1, wherein the first networked device is one of a plurality of first networked devices.

8. A method as claimed in claim 7, wherein the configuration device reads the identification data of all first networked devices prior to the establishment of the control relationship.

9. A method as claimed in claim 7, wherein the configuration device comprises a user interface which provides for selecting specific ones of the plurality of first networked devices, and wherein selected specific ones of the plurality of first networked devices are included in the control relationship.

10. A method as claimed in claim 9, wherein the user interface further provides for deselecting specific ones of the plurality of first networked devices, and wherein deselected specific ones of the plurality of first networked devices are excluded from the control relationship.

11. A method as claimed in claim 1, wherein the configuration device further provides for copying an existing control relationship between the first networked device and a third networked device from said first networked device to the second networked device.

12. A method as claimed in claim 1, wherein the control relationship comprises a membership of a group of networked devices.

13. A method as claimed in claim 1, wherein, when the second networked device is in an off or low-power state, the second networked device is woken up as a result of an interaction between the configuration device and the second machine-readable tag, and/or wherein, when the first networked device is in an off or low-power state, the first networked device is woken up as a result of an interaction between the configuration device and the first machine-readable tag.

14. A method as claimed in claim 1, wherein, when the second networked device is in an off or a low-power state, the second networked device verifies, after or upon waking up, whether the identification data of the first networked device has been written to the second machine-readable tag, and if so, then the second networked device uses the identification data of the first networked device to establish a control relationship between the first networked device and the second networked device.

15. A method as claimed in claim 1, wherein the second networked device transmits a setup message to the first networked device in order to establish said control relationship, and wherein the second networked device retransmits said setup message if it has not received a confirmation of receipt of said setup message from the first networked device after a predetermined amount of time.

16. A method as claimed in claim 1, wherein the second networked device transmits a setup message to the first networked device in order to establish said control relationship, and wherein, when the first networked device is in an off or low-power state, the first networked device transmits, after or upon waking up, a broadcast message into the network in order to retrieve said setup message.

17. A method as claimed in claim 1, wherein the second networked device transmits a setup message to a central registry in order to establish said control relationship, and wherein, when the first networked device is in an off or a low-power state, the first networked device queries, after or upon waking up, the central registry for said setup message.

18. A method as claimed in claim 1, wherein the configuration device, upon reading the identification data of the first networked device from the first machine-readable tag, sets a flag in said first machine-readable tag, and wherein, when the first networked device is in an off or a low-power state, the first networked device verifies, after or upon waking up, whether said flag is set, and if so, the first networked device checks for the presence of a setup message intended to establish said control relationship.

19. A method as claimed in claim 18, wherein the configuration device, upon reading the identification data of the first networked device from the first machine-readable tag, further writes contact data into the first machine-readable tag, and wherein, when the first networked device is in the off or low-power state, the first networked device uses, after or upon waking up, said contact data to query a device identified by said contact data for the presence of said setup message.

20. A method as claimed in claim 18, wherein the configuration device, upon reading the identification data of the first networked device from the first machine-readable tag, further writes a relationship identifier into the first machine-readable tag, said relationship identifier uniquely identifying a specific control relationship and a corresponding specific setup message, and wherein the first networked device checks for the presence of said specific setup message after or upon waking up.

21. A method as claimed in claim 1, wherein a validation step is performed to determine whether the first networked device and the second networked device form part of the network.

22. A method as claimed in claim 21, wherein, if the first networked device and/or the second networked device do not form part of the network, the first networked device and/or the second networked device are joined into the network prior to establishing the control relationship.

23. A method as claimed in claim 1, wherein the configuration device writes the identification data of the first networked device to the second machine-readable tag via a secure communication channel.

24. A configuration device for use in a method as claimed in claim 1, said configuration device being adapted to read identification data of a first networked device from a first machine-readable tag, said first machine-readable tag being connected to said first networked device;

said configuration device further being adapted to write the identification data of the first networked device to a second machine-readable tag while supplying power necessary to accomplish said writing to the second machine-readable tag, said second machine-readable tag, said second machine-readable tag being connected to a second networked device, such that a controller unit of the second networked device may read the identification data of the first networked device from the second machine-readable tag;

and such that the controller unit of the second networked device may use the identification data of the first networked device to establish a control relationship between the first networked device and the second networked device.

25. A configuration device as claimed in claim 24, the configuration device being an NFC-enabled smart phone or a web tablet.

26. A second networked device for use in a method as claimed in claim 1, said second networked device comprising a controller unit adapted to read identification date of a first networked device from a second machine-readable tag connected to said second networked device;

wherein the controller unit of the second networked device is further adapted to use the identification data of the first networked device to establish a control relationship between the first networked device and the second networked device, said identification data of the first networked device having been read from a first machine-readable tag by a configuration device, said first machine-readable tag being connected to said first networked device;

and said identification data of the first networked device having been written to the second machine-readable tag by said configuration device while said configuration device has supplied the power necessary to accomplish said writing to the second machine-readable tag.

27. A computer program product comprising program elements executable by a configuration device or a second networked device, wherein each program element comprises program instructions which, when being executed by the configuration device or the second networked device, cause said configuration device and second networked device to carry out or control respective steps of a method as claimed in claim 1.

* * * * *